3,245,813
SILICA REFRACTORIES

Thomas Rickman Lynam, deceased, late of Oughtibridge, near Sheffield, England, by Stanley Carter Walker, Worksop, and Emilyn Jones, Sheffield, England, executors, and Anthony Nicholson, Sheffield, and William Cecil Gilpin, Welbeck Woodhouse, England, assignors to The Oughtibridge Silica Firebrick Company Limited, Oughtibridge, Yorkshire, England, a British company
No Drawing. Filed Sept. 14, 1961, Ser. No. 138,192
Claims priority, application Great Britain, Sept. 16, 1960, 31,976/60
7 Claims. (Cl. 106—69)

This invention relates to silica-based refractories and has particular reference to unfired silica-based refractories especially suitable for the roofs of electric arc furnaces for steel-making. The roofs of electric arc furnaces are generally formed with concentric rings of burnt silica brick with special shapes in the central area, or bulls eye, where the electrodes, usually three in number, pass through the roof and into the furnace. For the outer two or three rings firebrick is often employed. To obtain improved furnace performance longer roof life has been sought and other refractory materials have been tried, including fired and chemically bonded alumina brick and fired and chemically bonded basic brick, but none of these have proved entirely successful. Attempts have also been made to devise more rapid means of forming the refractory lining of the roof by using in place of bricks ramming mixes or castable compositions. Ramming mixes are specially graded compositions of refractory aggregates with a small proportion of hydraulic or chemically setting material. They are mixed with 5 to 15% of water or other liquid on the site and are then rammed into place within formers by means of peg rammers, pneumatic rammers or by hand stamping. Castable compositions are compounded from mixtures of appropriately graded refractory aggregates and a finely divided cementitious material. These mixtures are gauged with water on the site to the consistency and nature of concrete and are then cast in position between formers. Both castable compositions and ramming mixes are fired in situ in the furnace, i.e. they are not fired in separate kilns before use.

It is well known that the silica used in producing silica refractory bricks must be of a special kind or must be specially heat treated before use if production is to be successful inasmuch as on heating changes in the crystalline form of the silica occur accompanied by marked increases in volume. In brickmaking, careful control of raw materials, brick grading and firing is exercised to ensure that the bricks, as a result of these volume changes, do not crack or shatter. It is hardly possible to control the heating of large steel furnaces to the degree that is necessary in the firing of silica bricks and for this reason silica has hitherto been considered an unsuitable material for use in unfired refractory products.

We have now discovered a method of producing a silica refractory material which can be used for the production of unfired silica-based refractory products including ramming mixes and bricks and shapes.

According to the present invention, there is provided a method for the production of a refractory composition having a basis of silica, which method comprises mixing a silica rock having a substantially constant coefficient of expansion with relation to temperature over the range of substantially 900° C. to 1300° C., together with a bonding agent comprising burnt magnesia or millscale or mixtures thereof, phosphoric acid having a specific gravity of not less than 1.60, and water, the amount of burnt magnesia and/or millscale being within the range 2 to 8% by weight on the weight of the silica rock, and the total proportion of phosphoric acid added to the mix being within the range 2 to 15% by weight based on the combined weight of silica rock, and magnesia and/or millscale, the proportion of phosphoric acid to magnesia and/or millscale being such that there is no substantial excess of acid over that required chemically to form monobasic phosphates.

When the composition is to be used as a ramming mix, the aqueous solution of phosphoric acid is added to the solid ingredients of the mix immediately before ramming into place.

The silica used in the present process is preferably silicia rock of the type known as silcrete which is available, for example, from South Africa. Other types of silica rock are also suitable, e.g. quartzite, such as may be obtained from North Wales, provided that on heating they give a reasonably uniform rate of expansion as is the case with silcrete.

The silica should be desirably graded to give the combination of properties most desired in the finished refractory. Thus, if good spalling resistance coupled with high density are required, grading may be 45 parts coarse silica, 10 parts medium silica, and 45 parts fine silica. By coarse silica we mean —5+30 B.S. mesh, by medium silica we mean —30+60 B.S. mesh and by fine silica we mean tube or other mill power —60 B.S. mesh.

The magnesia for use in the present invention must be one which is not highly chemically reactive since such a magnesia would result in mixtures which set too rapidly. A suitable magnesia is dead-burnt magnesia or periclase and particularly dead-burnt magnesia obtained from sea water. The grading of the dead-burned magnesia is preferably such that the mean particle diameter is substantially all finer than $150\mu$ and substantially all coarser than $5\mu$ with between 50 and 80 percent of the burnt magnesia having a mean particle diameter within the range $10\mu$ to $70\mu$.

As an alternative to magnesia, millscale may be used, or mixtures of magnesia and millscale. Millscale is the oxide of iron which is formed by surface oxidation during the heat treatment and mechanical processing of iron or steel. It is also known as plate-scale when it arises from plates and wire-scale when it arises from wire. Millscale is largely magnetite-$FeO_3$ magnetic iron oxide, and is the only kind of magnetic iron oxide which has been found to be suitable. If millscale is considered as $FeO \cdot Fe_2O_3$, it is probably the FeO which is the main active ingredient. The grading of the millscale is desirably such that the mean particle diameter is substantially all finer than $150\mu$ and substantially all coarser than $2\mu$ with between 50 and 80 percent of the proportion of millscale having a mean particle diameter within the range $3\mu$ to $70\mu$. The millscale should be reasonably fresh, and should not have been exposed to water and air for long periods as this causes surface deactivation.

It is preferred that the phosphoric acid used in the present invention is orthophosphoric acid having a specific gravity of 1.60 to 1.75. The amount of phosphoric acid which may be used is 2 to 15% by weight on the weight of the mixture, although the total liquid added to the mix should be from 2 to 20% by weight on the weight of the mixture. However, the amount of phosphoric acid used in relation to the amount of dead-burnt magnesia and/or millscale used, must be such that there is no substantial excess of acid over that required chemically to form monobasic phosphates with the magnesia and millscale, i.e. $Mg(H_2PO_4)_2$ with magnesia and

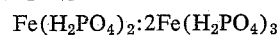

$$Fe(H_2PO_4)_2 : 2Fe(H_2PO_4)_3$$

with millscale. Where more liquid than the amount of phosphoric acid desired is required, the phosphoric acid is diluted with the appropriate amount of water, for example, the desired addition of phosphoric acid might be 5% and the desired amount of tempering liquid might be 10% in which case 5% of water would be added.

The time of setting of the mixture can be controlled from a few minutes to several hours, by the amount and the fineness of the millscale and magnesia and by the amount of the phosphoric acid. The desired setting time of the refractory mix varies according to the application but lies between a minimum of five minutes and a maximum of six hours.

It is preferred that the cold crushing strength of the refractory composition before firing, that is before use in the furnace but after the refractory composition has set, is greater than 500 lbs./sq. in., although mixes giving a cold crushing strength down to 200 lbs./sq. in. may be used where only low loads will be encountered, for example, in the doors of open hearth furnaces.

The compositions of the invention may be used in contact with iron, steel or other metals, in this case, however, it is necessary to include in the mix a suitable inhibitor to prevent or reduce the metal-acid reaction. These inhibitors may vary widely in nature and composition and in some cases their exact composition is not known, see, for example, the "Metal Handbook" (published in 1958 by the American Society for Metals) page 727, column 2. Examples of such inhibitors are the sulphonated coal tar products or mixtures of tertiary amines derived from coal tar bases such as Rodine 77 which is manufactured by Merril Chemicals Ltd. of Sheffield.

Where it is desirable to have a very small firing expansion, a proportion of up to 30 percent of calcined silica may be included in the composition.

When ramming mixes are to be made the graded silica and the magnesia are mixed together and sent to the point at which they are to be used and are gauged on site with the appropriate amount of aqueous solution of phosphoric acid; the damp mixture is then worked into place by the methods already mentioned. When refractory bricks and shapes are to be produced the mixture of silica and magnesia is gauged with the aqueous solution of phosphoric acid and the damp mixture is either cast into moulds, or tamped into the moulds, for example, by pneumatic rammers or hydraulically pressed as is found most convenient. The bricks or shapes are then either naturally or artificially air dried.

Following is a description by way of example only of methods of carrying the invention into effect.

*Example I*

107 lbs. of dry silica was mixed with 5 lbs. of ground dead-burnt magnesia having the following grading:

| | Percent |
|---|---|
| +100 B.S. mesh | 5.0 |
| —100 +150 B.S. mesh | 4.0 |
| —150 +200 B.S. mesh | 16.0 |
| —300 (Mean particle diameter 20μ) B.S. mesh | 62.5 |

The silica was prepared from South African silcrete rock and had the following grading:

| | Percent |
|---|---|
| —3/16" +7 B.S. mesh | 18 |
| —7 +25 B.S. mesh | 28 |
| —25 +100 B.S. mesh | 26 |
| —100 +200 B.S. mesh | 8 |
| —200 B.S. mesh | 20 |

These materials were mixed together by hand in the maner normally employed when making concrete, and were subsequently gauged with one gallon of a 50% volume for volume solution of orthophosphoric acid (specific gravity 1.65) with water.

The whole was thoroughly mixed and was then cast into bricks and allowed to set. The resulting refractory units were found to have the following properties:

| | |
|---|---|
| Bulk density (gms./cc.) | 2.10 |
| Cold crushing strength (lbs./sq. in.) | 980 |
| Linear change of 9" x 4.5" x 3" test piece after firing at 1400° C. for 2 days | +3.1% |
| Refractoriness under load (28 lbs./sq.in. 10° C./min. rise in temperature): | |
| Initial failure (° C.) | 1710 |
| 2% collapse (° C.) | 1745 |

*Examples II and III*

Mixes were prepared as described in Example I and having the ingredients as set out in the following table:

| | Example II | Example III |
|---|---|---|
| Graded Silica Rock, lbs | 107 | 107 |
| Ground Millscale, lbs | 5 | 5 |
| Orthophosphoric acid, Specific Gravity 1.65, gln | ½ | ½ |
| Water, gln | ½ | 1 |
| Rodine 77 (Acid/Steel Reaction Inhibitor), oz | | 1 |

The silica rock was prepared from South African silcrete and had the same grading as in Example I.

The grading of the millscale was as follows:

| | Percent |
|---|---|
| +100 B.S. mesh | 5.4 |
| —100 +200 B.S. mesh | 20.5 |
| —200 +300 B.S. mesh | 7.5 |
| —300 (mean particle diameter 5μ) B.S. mesh | 67.5 |

The compositions were thoroughly mixed and moulded into bricks as in Example I. The resulting bricks after setting had the following properties:

| | Example II | Example III |
|---|---|---|
| Bulk density, gms./cc | 2.13 | 1.89 |
| Cold crushing strength (lbs./sq. in.) | 1,600 | 1,150 |
| Linear change of 9" x 4½" x 3" test piece after firing at 1,400° C./2 days, percent | +2.01 | +1.99 |
| Refractoriness under load (28 lbs./sq. in. 10° C./min. rise of temperature): | | |
| Initial fail, ° C | 1,710 | 1,705 |
| 2% collapse, ° C | 1,750 | 1,742 |

Where it is desirable to have a very small firing expansion, a proportion of up to 30 percent of calcined silica can be used in the batch.

*Example IV*

To demonstrate the effect of the fineness and the amount of the magnesia and the amount of the phosphoric acid on the setting time and crushing strengths of the composition, six batches of the composition were made up by the method described in Example I and in the proportions shown in the following table:

| | Experiment No. | | | | | |
|---|---|---|---|---|---|---|
| | 1 | 2 | 3 | 4 | 5 | 6 |
| | (Parts by weight) | | | | | |
| Graded Silica | 100 | 100 | 100 | 100 | 100 | 100 |
| Dead-burnt magnesia powder: | | | | | | |
| Mean Particle Dia. 5μ | 4 | | | | | |
| Mean Particle Dia. 20μ | | 4 | | 2 | 3 | 4 |
| Mean Particle Dia. 70μ | | | 4 | | | |
| Phosphoric Acid, Specific Gravity 1.75 | 13 | 13 | 13 | 12 | 12 | 9 |
| Water | 2 | 2 | 2 | 3 | 3 | 5 |
| Setting time (Minutes) | 5 | 30 | 150 | 250 | 120 | 10 |
| Cold Crushing Strength (lbs./sq. in.) | 1,500 | 200 | 500 | 400 | 500 | 800 |

The silica was the same as that used in the previous examples.

As can be seen from the table, the setting time can be varied from 5 minutes to 4 hours and 10 minutes by altering the proportions of phosphoric acid and the grading and proportions of the dead-burnt magnesia powder.

The setting time was determined by measuring the indentation produced in the gauged mix by the action of a cylindrical plunger a quarter of an inch in diameter and loaded to give a pressure of 120 lbs./sq. in. and applied normally to a surface of the test specimen.

*Example V*

Three batches of the composition of the invention were prepared as in Example IV using the proportions as set out in the following table:

|  | Experiment No. | | |
| --- | --- | --- | --- |
|  | 1 | 2 | 3 |
|  | (Parts by weight) | | |
| Silica (graded as in Example I) | 100 | 100 | 100 |
| Millscale powder Mean particle diameter 5μ | 4 |  |  |
| Millscale powder Mean particle diameter 15μ |  | 4 |  |
| Millscale powder Mean particle diameter 60μ |  |  | 4 |
| Phosphoric Acid, Specific Gravity 1.75 | 13 | 13 | 13 |
| Water | 2 | 2 | 2 |
| Setting Time (Minutes) | 60 | 210 | 300 |
| Cold Crushing Strength, lbs./sq. in | 3,700 | 1,700 | 1,300 |

The setting time and cold crushing strengths were noted as before.

It can be seen from the results of Examples IV and V, that the setting time of the composition increases with the particle size of the magnesia and the millscale.

*Example VI*

The roof of a 5-ton electric furnace was lined with a composition prepared as follows:

28 lbs. of dry silica prepared from South African silcrete rock and having a grading of 45 parts coarse silica, 10 parts medium silica and 45 parts fine silica was mixed with 1½ lbs. of fine dead-burnt sea-water magnesia. By coarse silica is to be understood a silica having a particle size $-5+30$ B.S. mesh, by medium silica, a silica having a particle size $-30+60$ B.S. mesh and by fine silica, a silica powder of particle size smaller than 60 B.S. mesh. The burnt magnesia had a mean particle diameter of $-150\mu+20\mu$ and 65% of its weight of particles finer than 100μ and coarser than 40μ. These materials were mixed together by hand in the normal manner when making concrete and were gauged with 2½ lbs. by weight of a mixture of equal parts orthophosphoric acid, specific gravity 1.75 and water. The whole was thoroughly mixed and was then immediately hand rammed on to a former using thin rods, i.e., it was peg rammed. The surface was finished with a flat hand rammer and the refractory mass was allowed to set for 24 hours. The roof was then put onto the furnace and the furnace used in the normal manner. No spalling, flaking or other failure of the refractory occurred and the life was greater than that obtained with the best quality burnt silica brick.

We claim:

1. A method for the production of a self-setting refractory composition having a basis of silica, which method comprises mixing a silica rock chosen from the group consisting of silcrete and quartzite having a substantially constant coefficient of expansion with relation to temperature over the range substantially 900° C. to 1300° C., with a bonding agent consisting essentially of a mixture of phosphoric acid having a specific gravity of not less than 1.60 and water, together with a solid component selected from the group consisting of millscale and burnt magnesia; the particles of the solid component of the bonding agent being finer than 150μ and at least 50 to 80% of the particles being finer than 70μ, the amount of the solid component of the bonding agent being within the range 2 to 8% by weight on the weight of the silica rock, and the total proportion of phosphoric acid added to the mix being within the range 2 to 15% by weight based on the total weight of the solid components of the composition, the proportion of phosphoric acid to the solid components of the bonding agent being such that there is no substantial excess of acid over that required chemically to form monobasic phosphates.

2. A method as claimed in claim 1 wherein the solid component of the bonding agent is burnt magnesia in which the particles are substantially all coarser than 5μ and have a mean particle diameter within the range 10μ to 70μ.

3. A method as claimed in claim 1 wherein the solid component of the bonding agent is millscale in which the particles are substantially all coarser than 2μ and have a mean particle diameter within the range 3μ to 70μ.

4. A method as claimed in claim 1 wherein the silica rock is silcrete.

5. A method as claimed in claim 1 wherein the silica rock is quartzite.

6. A method as claimed in claim 1 wherein up to 30% of the silica has been calcined.

7. A refractory composition was produced by the method claimed in claim 1.

References Cited by the Examiner

UNITED STATES PATENTS

| 1,435,416 | 11/1922 | Ottman | 106—69 |
| 2,802,750 | 8/1957 | Veale et al. | 106—69 |

TOBIAS E. LEVOW, *Primary Examiner.*

JOHN H. MACK, *Examiner.*